United States Patent [19]

Waldron

[11] 4,310,334

[45] Jan. 12, 1982

[54] METHODS OF PRODUCING FUELS FROM SOLID MATERIALS

[75] Inventor: Robert D. Waldron, Houston, Tex.

[73] Assignee: Dale D. Hammitt, Orange, Calif.

[21] Appl. No.: 12,562

[22] Filed: Feb. 15, 1979

[51] Int. Cl.³ ............................ C07C 1/00; C10J 3/00
[52] U.S. Cl. ................................... 48/197 R; 48/60;
48/216; 252/182; 423/439; 423/440; 423/657;
423/658; 585/733
[58] Field of Search ................. 48/197 R, 216, 38, 59,
48/60; 423/439, 440, 441, 442, 657, 658;
585/733, 943; 252/182

[56] References Cited

U.S. PATENT DOCUMENTS

| | | |
|---|---|---|
| 260,954 | 7/1882 | Dixon. |
| 889,124 | 5/1908 | Hartenstein. |
| 1,173,417 | 2/1916 | Ellis. |
| 1,445,644 | 2/1923 | Reid. |
| 1,735,925 | 11/1929 | Jaeger. |
| 1,741,307 | 12/1929 | Jaeger. |
| 1,824,896 | 9/1931 | Jaeger. |
| 1,938,202 | 12/1933 | Williams. |
| 1,960,886 | 5/1934 | Woodhouse. |
| 2,445,796 | 7/1948 | Millendorf ....................... 260/449.6 |
| 2,602,019 | 7/1952 | Odell. |
| 2,654,661 | 10/1953 | Gorin ................................. 48/197 R |
| 2,781,248 | 2/1957 | Gorin. |
| 2,802,723 | 8/1957 | Lemke. |
| 2,942,959 | 6/1960 | Rees et al. ............................... 48/197 |
| 3,031,287 | 4/1962 | Benson et al. ..................... 48/197 R |
| 3,108,857 | 10/1963 | Gorin et al. |
| 3,115,394 | 12/1963 | Gorin et al. |
| 3,154,378 | 10/1964 | Schneider et al. |
| 3,188,179 | 6/1965 | Gorin. |
| 3,201,052 | 8/1965 | Feldmann et al. ..................... 241/23 |
| 3,405,068 | 10/1968 | Hiltz ....................................... 252/182 |
| 3,771,259 | 11/1973 | Portz et al. ............................. 48/60 |
| 4,009,219 | 2/1977 | Tamers ................................. 423/439 |
| 4,137,295 | 1/1979 | Tamers ................................. 423/439 |
| 4,184,852 | 1/1980 | Russ ................................... 48/197 R |

OTHER PUBLICATIONS

Myers et al., "The Preparation and Hydrolysis of Manganese Carbide (Mn₃C), JACS, vol. 67, Nov. 1945.
Bradley et al., "Hydrolysis of Uranium Carbides", pp. 190-195, Inorganic Chemistry, vol. 3, No. 2, Feb. 1964.
Putnam et al., "Hydrocarbons from Carbides", Chemical Reviews, vol. 20, No. 1 pp. 134, 135, 140, 141 (date unavailable).
Kirk-Othmer, "Encyclopedia of Chemical Technology", vol. 4, 2nd Ed., pp. 75-76 (date unavailable).
"Solubility of Calcium Carbide in Fused Salt Systems", Barber et al., Journal of Physical Chem., 1961, vol. 65.
Carbides, Kosolapova, 1971 Plenum Press, pp. 41, 47, 48, 49, 74, 245, 246.

Primary Examiner—Peter F. Kratz
Attorney, Agent, or Firm—Harvey B. Jacobson

[57] ABSTRACT

The present invention relates to a method for producing gaseous or liquid fuels or hydrocarbons from solid mineral sources and, more particularly, to a process for producing solid compounds, hereinafter designated fuel precursors, capable of releasing or generating flammable gases or liquids by chemical and/or physical conversion phenomena and to the process and methods to accomplish said fuel generation. The fuel precursors consist primarily of carbides formed from two or more metallic elements combined with carbon. The precursors additionally may contain minor amounts of free metal, unreacted carbon or other impurities.

20 Claims, 2 Drawing Figures

METHODS OF PRODUCING FUELS FROM SOLID MATERIALS

BACKGROUND OF THE INVENTION

It is well-known that various simple carbides can be used to produce fuel gases such as acetylene, methane, allylene, etc., and that calcium carbide manufacture and conversion to acetylene has provided the basis for a major industry for many years. Nevertheless, carbide-acetylene has never had a measurable impact on the production of general purpose fuels. Rather, its applications have been restricted to providing high energy fuel for the welding gas industry plus major non-fuel or chemical applications, for example, as a chemical intermediate. Several factors have precluded more widespread use of calcium carbide derived acetylene for general fuel purposes; among these are: (1) High input power requirements resulting from the necessity of employing electric arc furnaces to reach the temperatures needed to manufacture calcium carbide (approximately 2000° C.); (2) The hazards of handling the derived acetylene, either under pressure or in mixtures with air, due to its endothermic nature; (3) The magnitude of the disposal problem for the spent lime that would arise if large amounts of carbide acetylene were used for general fuel purposes; (4) Transportation costs of raw materials and calcium carbide occasioned by high total tonnages per unit fuel value; and (5) Total system costs in comparison with alternative fuel systems.

Patents and a literature article bearing upon the state of the art of manufacture or reaction of carbides or generation of combustible volatiles of the type contemplated in the present invention includes the following:

U.S. Pat. No. 2,802,723—Aug. 13, 1957
U.S. Pat. No. 3,031,287—Apr. 24, 1962
U.S. Pat. No. 3,154,378—Oct. 27, 1964
U.S. Pat. No. 3,201,052—Aug. 17, 1965
U.S. Pat. No. 1,735,925—Nov. 19, 1929
U.S. Pat. No. 1,741,307—Dec. 31, 1929
U.S. Pat. No. 1,824,896—Sep. 29, 1931
U.S. Pat. No. 2,445,796—July 27, 1948
U.S. Pat. No. 2,942,959—June 28, 1960
U.S. Pat. No. 3,771,259—Nov. 13, 1973
U.S. Pat. No. 3,405,068—Oct. 8, 1968
U.S. Pat. No. 889,124—May 26, 1908
U.S. Pat. No. 1,445,644—Feb. 20, 1923
U.S. Pat. No. 260,954—July 11, 1882
U.S. Pat. No. 3,115,394—Dec. 24, 1963
U.S. Pat. No. 2,781,248—Feb. 12, 1957
U.S. Pat. No. 2,654,661—Oct. 6, 1953
U.S. Pat. No. 1,173,417—Feb. 29, 1916
U.S. Pat. No. 1,938,202—Dec. 5, 1933
U.S. Pat. No. 1,960,886—May 29, 1934
U.S. Pat. No. 3,188,179—June 8, 1965
U.S. Pat. No. 3,108,857—Oct. 29, 1963
U.S. Pat. No. 2,602,019—July 1, 1952.
Journal of Phys. Chem.-Vol. 65, pp. 2026–2028 (1961).

While the principal volatile products of conversion of carbide "fuel precursors" are hydrocarbons, they may be accompanied by various lesser amounts of hydrogen, carbon monoxide, carbon dioxide and compounds containing carbon, hydrogen and oxygen (and/or additional elements). In the succeeding discussion, the term "fuel" shall refer to all such volatiles, and "fuel precursor" shall designate a compound capable of generating all such volatiles where used for fuel or non-fuel purposes.

It is therefore a primary object of the present invention to provide a process for the economical production of fuel precursors and for the conversion of the fuel precursors to hydrocarbon gases or liquids for various fuel or non-fuel uses.

It is another object of the invention to provide a method of producing a fuel gas compound or mixture of greater intrinsic stability and safety than acetylene, for example, a fuel gas consisting primarily of methane or comparable compounds.

Another further object of the present invention is to provide a process for the manufacture of fuel precursors, which process uses substantially less power per unit derived fuel energy than the calcium carbide-acetylene system, which can be operated at substantially lower temperatures, and for which the mineral residue (oxide-hydroxide) generated from the fuel gas conversion stage can be readily and economically recycled to manufacture more fuel precursor.

Still another object of the present invention is to provide a fuel precursor which may be stored or stockpiled safely without undue fire hazard or deterioration due to air exposure or other factors, to provide an economical reserve capacity for accommodating short term or seasonal fluctuations in fuel demand or supply requirements during scheduled or unscheduled interruptions in manufacture of fuel precursor.

Yet another object of this invention is to provide a continuous process for the manufacture of fuel precursor and a conversion process for hydrocarbon generation which may be rapidly adjusted to meet utility demand loads.

A further object of the invention is to provide mineral carbide fuel precursors which are convertible to fuel gases or liquids.

Yet a further object of the present invention to provide fuel precursors from which sulfur and other noxious or undesirable impurities introduced by the coal or other raw materials during manufacture of the precursors can be substantially reduced or removed easily to provide environmentally clean gaseous or liquid fuels.

Even another object of the invention is to provide fuel precursors capable of generating high yields of unsaturated hydrocarbons, such as olefins and acetylenes, which are useful for manufacture of polymers and other valuable chemical products.

These together with other objects and advantages which will become subsequently apparent reside in the details of the process and operation of the invention as more fully hereinafter described and claimed, reference being had to the accompanying drawings forming a part hereof, wherein like numerals refer to like parts throughout.

DESCRIPTION OF THE PREFERRED EMBODIMENTS

Figure 1:
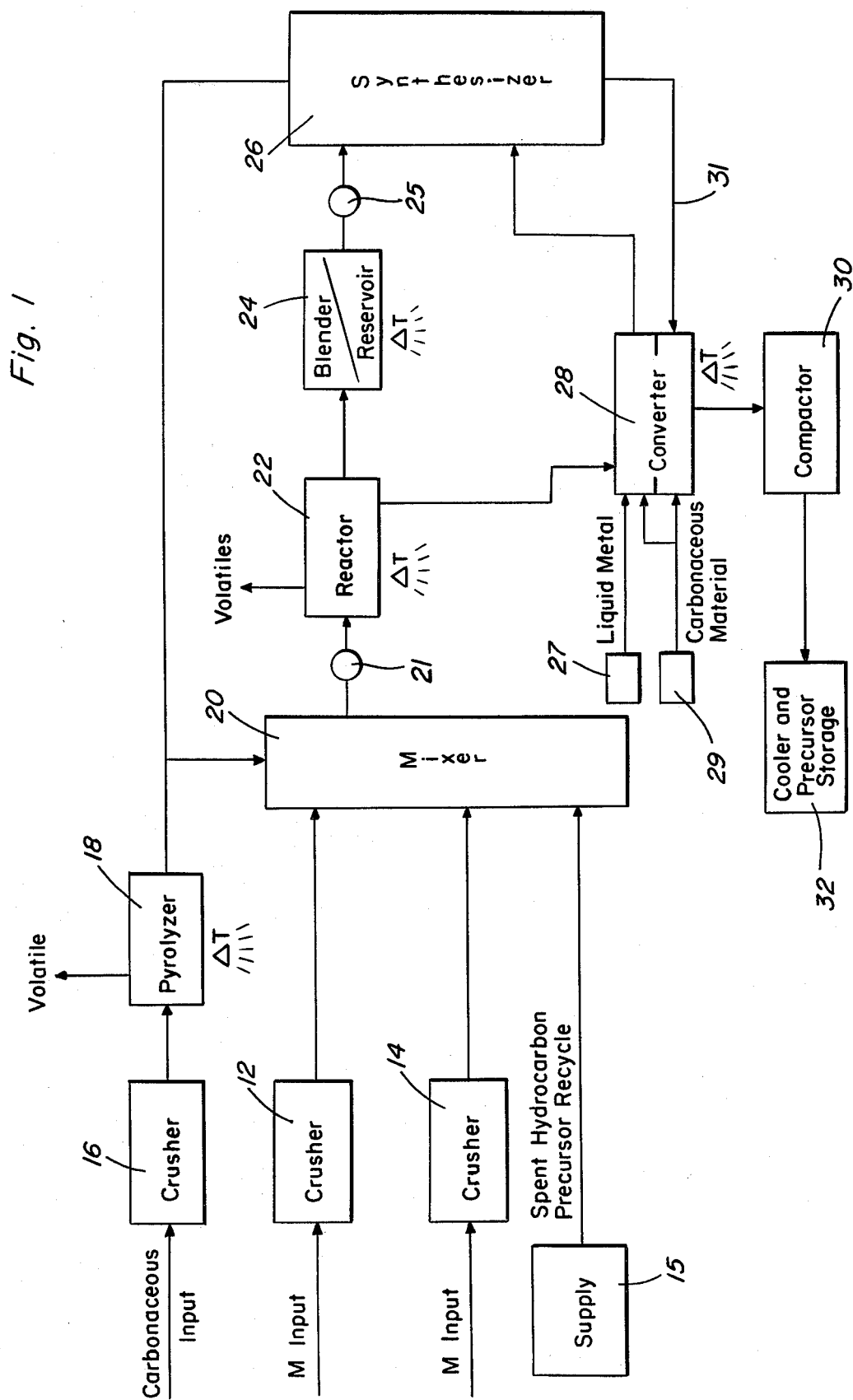
FIG. 1 is a schematic representation of a process for producing fuel precursors (solid).

A recent review of metal carbides by Frad reports that of the 75 metallic and semi-metallic elements of atomic number 92 or lower, at least 48 form binary compounds with carbon (i.e. carbides) with another 7 elements having been reported as having formed carbides but whose existence requires further confirmation. Hundreds of carbides have been investigated in which two or more metallic elements are combined with carbon, both as true compounds with more or less fixed ratios of metallic elements, and as solid solutions between simple binary carbides. A problem in characterizing such complex systems, as well as binary carbides, is the tendency toward defect structures in which significant fractions of the lattice sites normally occupied by metal or carbon atoms may be vacant.

It is desirable to classify carbides in regard to chemical and physical properties or thermodynamic stabilities to identify those compounds useful as fuel precursors, refractories, abrasives or for cutting tool applications, and to indicate possible methods of preparation.

The classification of carbides into "salt-like" compounds and "metal-like" compounds is most useful in describing their general properties. Salt-like or ionic carbides are electrical insulators with thermophysical properties similar to oxides and usually showing little tendency toward defect structures. They are generally reactive toward water or dilute acids, are reducing agents at elevated temperatures and tend to dissolve in fused salt systems. These carbides are usually formed from the more basic metals such as alkali, alkaline earth, and aluminum family elements. On the other hand, metal-like carbides are electrical conductors with thermophysical properties similar to metals and usually showing an appreciable tendency toward defect structures. Most are substantially unreactive toward water or dilute acids at normal temperatures, do not behave as reducing agents except at extremely high temperatures and are generally chemically inert. Many are also extremely hard materials with high melting points. These metal-like carbides are usually formed from less basic elements such as transition metals or semi-metals; however, they also include lanthanide or actinide element carbides. Some exceptions to the above general trends may be noted in, for example, a number of carbides of the rare earth elements, thorium and uranium. Such carbides behave principally like ionic carbides but are electrical conductors, apparently due to lower than normal chemical valence and close metal-metal atomic distances in the crystal structure. In addition, some metallic carbides of first transition series elements such as vanadium, chromium, manganese, iron, cobalt and nickel behave in most characteristics like metallic or interstitial carbides, but are more reactive or corrodible by water or dilute acids, apparently resulting from atomic size defects in the crystal structure.

A classification of carbides on the basis of thermodynamic stability is useful in indicating possible methods of preparation, precautions in storage and handling and reactivity at various temperatures. It is convenient to use five categories which may be designated as highly stable, stable, metastable, marginally unstable, and highly unstable.

The highly stable carbides are limited to interstitial carbides of the transition elements which have negative heats of formation in excess of $-(25)$Kcal/mole° C. and which are extremely hard, refractory, and chemically inert. Examples include TiC, ZrC, TaC, NbC, and the like. Tungsten carbides, boron carbide and silicon carbide have lower heats of formation but have similar properties and should probably be included in this group.

The stable carbides include those carbides with negative free energies of formation at all temperatures from room temperature to 1200° C. or more except those carbides included in the first group. In this category are the carbides of the alkaline earth metals (except magnesium), aluminum, certain high carbides of chromium, manganese and the rare earth metals.

Metastable carbides are those compounds which are thermodynamically stable with respect to free metal and carbon at some elevated temperature but, even though unstable at ambient temperatures, can be quenched and preserved indefinitely at low or ambient temperatures. Examples include $Mn_3C$, $Mn_{15}C_4$, $UC_2$, MoC, etc.

The marginally unstable carbides include carbides of iron, cobalt and nickel which are slightly less stable than the corresponding metal and graphite but which are also storable for indefinite periods at room temperature.

The last class, highly unstable carbides, consists of the carbides that cannot be formed from the elements, but may only be prepared by lower temperature indirect processes from carbon compounds. These include the carbides of magnesium, zinc, copper, silver, etc. If their heats of formation are too positive, they may be subject to explosive decomposition.

For the purpose of evaluating carbides of potential utility in the generation of fuel gases or liquids, it is necessary to understand the chemical reactions of the various carbides, especially toward water or steam. Unfortunately, a large number of carbides which have previously been reported have either not been studied for hydrolytic behavior or such studies as have been made are unreliable due to poorly characterized starting materials or imprecise methods of analysis. This is evident from conflicting data from several investigators.

Based on the first classification system (properties) discussed, one may summarize hydrolysis studies as follows:

1. The salt-like or ionic carbides normally hydrolyze to yield a single hydrocarbon characteristic of the carbide and on that basis may be classified as acetylides, methanides or allylides corresponding to acetylene, methane or allylene as the hydrolytic reaction product.
2. The metal-like carbides are for the most part substantially chemically inert at low temperatures, but some may be hydrolyzed (corroded), yielding a mixture of hydrocarbons and various amounts of hydrogen, oxides of carbon, etc., depending on the conditions of hydrolysis.
3. In the metal-like carbides which are hydrolyzable, the excess metallic atoms are capable of reducing the water to form neutral hydrogen atoms which can then directly reduce carbon atoms or react with unsaturated hydrocarbons or chemical intermediates such as methylene groups ($CH_2$). The hydrolysis reactions of these compounds are consistent with treating them as solid solutions of ionic carbides in excess free metal alloys of metal and hydrolyzable carbide.

Most studies of hydrolytic behavior have been carried out in aqueous solution at moderate temperatures, but various studies with steam at elevated temperatures have been made. It has long been known in the prior art that even very inert carbides such as SiC are attacked slowly by prolonged exposure to steam at about 2000° F. It appears that carbides, especially the metal-like compounds, behave in many regards like the parent metal forming a superficial layer of oxide or hydroxide in the presence of water vapor and that further attack is inhibited unless some mechanism is present to accelerate diffusion or migration of additional water molecules through the surface layers.

Composition of Fuel Products

Of the ionic carbides, it is well-known from previous work that the hydrolysis product of carbides formed from metallic elements of small ionic radii such as aluminum and beryllium consists primarily of methane and the product formed from the lower carbide of magnesium, with $Mg_2C_3$ forming allylene (methylacetylene). Most of the remaining ionic carbides yield acetylene upon hydrolysis.

For the metallic carbides, we may treat the mixture of carbide, excess metal and/or free carbon as a "pseudo-compound" of composition $M_ZC$, where the metal is represented by the symbol M. A fraction x of the carbon atoms yields hydrocarbons on hydrolysis, with a fraction $1-x$ appearing as free carbon. A nominal negative valence, v, is assigned to the x fraction of carbon (corresponding to $V = -v$ hydrogen atoms combined per carbon atom). Then $-V$ represents the valence of the carbon atom. Thus $V=4$ for pure methane formers, $V=3$ for ethane formers, $V=2$ for methylene or ethylene formers and $V=1$ for acetylene formers. We have found that the experimental results for transition metal carbides in the $Mn_3C$, $Fe_3C$, $Ni_3C$ series can be accommodated with a carbon valence of about $v=-2.8$ to $-3.4$. The rare earth dicarbides and sesquicarbides can be considered to have a carbon valence of about $v=-1$. The carbon content then contains Vx equivalents which are balanced by an equal number of metal ionic equivalents. The balance of the metal atoms can be considered as neutral metal.

The total number of metallic equivalents after hydrolysis is given by Z V where V is the average valence of lowest metallic states of constituent elements stable in the presence of water. The difference ZV-Vx represents the excess reducing power which appears as hydrogen in reaction products. We may thus write the over-all reaction as:

$$M_ZC + \frac{ZVH_2O}{2} = (1-x)C + xCH_V + \frac{(ZV - Vx)H_2}{2} + ZMO_{V/2}$$

The approximate value of fuel products heat of combustion per mole °C. is given by:

$$\Delta H_{COM} = x[136 + 19(V)] + \frac{(ZV - Vx)}{2} 68.3 \text{ Kcal/mole °C.}$$

Using the above formula we may determine the fuel gas heat of combustion for the following carbides:

| Compound | $\Delta H_{COM}$ (Kcal/mole C) | For x = 1, $\Delta H_{COM}=$ |
|---|---|---|
| $M_3C$ (V = 2, V = 3) | $x(193) + \frac{(6-3x)}{2} 68.3$ | 295.5 |
| $M_7C_3$ (V = 2, V = 3) | $x(193) + \frac{(14-9x)}{6} 68.3$ | 249.9 |

-continued

| Compound | $\Delta H_{COM}$ (Kcal/mole C) | For x = 1, $\Delta H_{COM}=$ |
|---|---|---|
| $M_3C_2$ (V = 2, V = 3) | $x(193) + \frac{(3-3x)}{2} 68.3$ | 193 |
| $M'C_2$ (V = 3, V = 1) | $x(155) + \frac{(3-2x)}{4} 68.3$ | 172.1 |
| $M_2'C_3$ (V = 3, V = 1) | $x(155) + \frac{(2-x)}{2} 68.3$ | 189.2 |
| $M_2'C_3$ (V = 3, V = 2) | $x(174) + (1-x) 68.3$ | 174 |
| $M'C_2$ (V = 2.5, V = 1) | $x(155) + \frac{(5-4x)}{8} 68.3$ | 163.5 |
| $M_2'C_3$ (V = 2.5, V = 1) | $x(155) + \frac{(5-3x)}{6} 68.3$ | 177.8 |

The specific heating value of the fuel gas depends on the distribution of carbon atoms between methane and higher hydrocarbons with 2, 3 or more carbon atoms per molecule.

Thus for $V=3$, $CH_3$ may be derived from $CH_3 = \frac{1}{2}CH_4 + \frac{1}{2}C_2H_4$ (m=1.33) or $CH_3 = \frac{1}{2}C_2H_6$ (m=2), where m is the average number of carbon atoms per hydrocarbon molecule. The heat of combustion per mole of carbon is nearly the same for both systems, but the heat of combustion per unit volume (gas mole) is 50% greater in the second case. As an example, for $Mn_3C$ the average number of carbon atoms per hydrocarbon molecule obtained on hydrolysis equals 1.45.

Energy Balance for Synthetic Fuels

All of the existing or proposed processes for producing hydrocarbons and/or carbon monoxide and hydrogen from carbonaceous sources may be considered as a sum of individual chemical reactions in which all reactants other than carbon and oxygen enter in a cyclic manner, emerging in the same compounds as they enter. For a given quantity of carbon, the potential heating value upon complete combustion is equal to 94.05 Kcal/gram mole (169.29 KBTU/lb mole) which may be taken as the theoretical input energy unless other forms of energy are also consumed. For every mole of carbon consumed a fraction f will be recovered as useful fuel gases and the fraction $1-f$ will be burned or otherwise lost to supply process heat. The fraction f may be divided into two parts, $f = f_{hc} + f_o$ where $f_{hc}$ is the fraction appearing in hydrocarbons and $f_o$ is the fraction appearing as carbon monoxide. The useful output heat is then given by:

$$\Delta H_{out} = f_{hc}\Delta H_{hc} + f_o\Delta H_{co} + f_{H2}\Delta H_{H2}$$

where $\Delta H_a$ is the average heat of combustion of a per mole (with hydrocarbons $C_mH_n$ rewritten as $CH_{n/m}$) and $f_{H2}$ is the fractional number of moles of hydrogen produced per mole of carbon consumed.

In the formation of fuel gas directly from carbon, the water gas (or synthesis gas) reaction is of importance:

$$C + H_2O = CO + H_2 \quad \Delta H = +41.9 \text{ Kcal/mole °C.}$$

Since the reaction is endothermic, the heat necessary is usually supplied by burning extra carbon. By noting that the heat of combustion of carbon to carbon dioxide is 94.05 Kcal/mole, it may be readily calculated that 0.445 additional moles of carbon must be burned to provide the theoretical amount of heat necessary to produce one mole of carbon monoxide by the above equation. Restated in terms of the previous discussion, the fraction $f=0.692$ of the original carbon is converted to CO while the fraction $1-f=0.308$ is burned to $CO_2$ to supply process heat. The output heat $\Delta H_{out}=0.692(67.65)+0.692(68.3)=94.05$ Kcal which is just equal to the theoretical input energy. All real processes will operate at less than 100% thermal efficiency due to thermal, frictional and other losses.

For processes that use metallic carbides as chemical intermediates, two other thermal figures of merit are useful, namely, net and gross heat ratios, where the net heat ratio is the ratio of heat of combustion of fuel gases produced to the heat of combustion of the carbide, and the gross heat ratio is the ratio of the sum of the heat of fuel gas combustion plus heat of conversion (hydrolysis) to the heat of combustion of the carbide. In these calculations, the oxidation of the metallic component is considered to be carried to the valence state normally found after hydrolysis. Table I shows heats of combustion and net heat ratios for various carbides.

TABLE I

Thermochemistry of Carbides

| Compound | Heat of Formation | Heat of Combustion | Fuel Gas Heat of Combustion | Net Heat Ratio |
|---|---|---|---|---|
| $CaC_2$ | −15 | 325 | 310.61 | .956 |
| $Al_4C_3$ | −48.6 | 1031.55 | 638 | .618 |
| $Mn_3C$ | −3 | 367.05 | 333 | .907 |
| $BeC_2$ | −5 | 316.5 | 310.6 | .981 |
| $Be_2C$ | −22.2 | 363.85 | 212.8 | .585 |
| $MgC_2$ | +21 | 352.9 | 310.6 | .88 |
| $Mg_2C_3$ | +19 | 588.75 | 463.1 | .787 |
| $Fe_3C$ | +5 | 290.15 | 269 | .927 |
| $ThC_2$ | −45 | 435.1 | | |
| $UC_2$ | −42 | 416.1 | 360 | .865 |
| $LaC_2$ | (−30 est) | (372 est) | (323–355 est) | |
| $La_2C_3$ | (−50 est) | (660 est) | (505–568 est) | |
| $CeC_2$ | (−30 est) | (375.5 est) | 355 | |
| $Ce_2C_3$ | (−50 est) | (667 est) | (505–568 est) | |

In Table I heats of formation or combustion are expressed in kilocalories per mole.

The net heat ratios are generally above 0.8–0.9, except for the ionic carbides which yield methane on hydrolysis. Thus, $Al_4C_3$ has a net heat ratio of 0.618 while $Be_2C$ has a value of 0.585, which are both too low for efficient synthetic fuel processes.

If we wish to formulate a carbide fuel process which is economical and produces a fuel with lower handling hazards than acetylene, we may eliminate from consideration all the simple ionic carbide. The remaining carbides are members of the alloy or metal-like carbide class. There are two principal types of metal-like carbides which may be considered as candidates for a synthetic fuel process: (1) Interstitial alloy carbides such as $Mn_3C$, $Fe_3C$ and related carbides of higher carbon content; (2) Rare earth or actinide carbides such as cerium, thorium, or uranium carbides.

The first class (interstitial alloy carbides) contains metals whose oxides are easily reducible, but their heating values per unit weight are low and their reactivity toward water or steam is low in some cases. In addition, they are difficult to prepare free of excess metal, which usually requires an acidic medium to effect hydrolysis.

The second class (rare earth or actinide carbides) is more reactive, but the metallic elements are difficult to reduce.

We have discovered that by modifying the composition of each class we can achieve practical advantages in realizing a practical synthetic fuel process.

It has been previously established that $Fe_3C$ and $Mn_3C$ form a continuous series of solid solutions. As the iron content increases, the energy efficiency of the fuel process increases, but the reactivity toward water or steam is lowered. To hydrolyze pure iron carbide requires either dilute acids or very high temperature steam. We have found that by incorporating small amounts of a reactive or corrodible metal such as calcium, magnesium, zinc, and/or aluminum to the alloy which is reacted with carbon to form the carbide, a limited amount of the reactive metal is incorporated in the carbide solid solution and an additional amount remains in the alloy phase. Alternatively, ternary phases such as $Al\,Fe_3C$ may be formed with the various mixed carbides.

In the usual methods of forming the transition metal carbides from molten metal and carbon, it is often difficult to prepare the carbides completely free from an excess metal-rich phase. This phase can be more resistant to action of water or steam. By incorporating sufficient reactive metal (Ca, Mg, Al, Zn) to reach a level of 2 to 30 atom percent of metal in the alloy phase, the corrodibility is enhanced allowing easier hydrolysis. It also tends to lower the melting point of the alloy, permitting synthesis at a lower temperature.

Slightly higher energy values per pound of fuel precursor can be achieved by hydrolyzing carbides of higher carbon content, such as $Mn_7C_3$, $Cr_7C_3$, or $Cr_3C_2$. These carbides, especially the chromium compounds, are quite resistant to hydrolysis. We have found that by alloying again with reactive metals such as Mg, Al, Zn, or Ca, we can produce a more easily corrodible carbide.

While chromium or vanadium do not form trichromium or trivanadium carbides, compounds may be formed by substituting one aluminum atom, as $Cr_2AlC$ or $V_2AlC$ which have a high potential energy value per pound. These compounds can also form solid solutions with the $(Fe, Mn)_3C$ system.

Among the Rare Earth carbides, cerium or lanthanum dicarbides or sesquicarbides $REC_2$ or $RE_2C_3$ have the best potential as a fuel precursor of previously reported carbides, where RE represents a rare earth metal. Similar compounds formed from Misch-metal or unseparated Rare Earth metals and carbon have a lower system cost for fuel generation.

We have discovered that by alloying the Rare Earth metal with bi- or trivalent metals of more easily reducible metals, especially of large ionic radius, the energy of formation may be lowered. On size grounds, calcium, strontium, barium, bismuth, lead, and tin are candidates, but the alkaline earth metals do not offer appreciable savings in energy. We have found that the solubility of smaller ions such as zinc or iron or manganese can be enhanced by co-dissolving a larger than normal ion such as barium.

While the substitution of divalent metal ions for Rare Earth ions can lower the molecular weight and reduction energy of the fuel precursor, it also lowers the fuel value of gases since the reducing capacity is lower for divalent than trivalent metals.

Preparation

It is well-known in the art that the following carbides may be prepared by one or more of the following procedures:

1. Direct combination of metallic element(s) and carbon:
   A. Solid state diffusion B. Melting + congruent solidification
C. Peritectic freezing
D. Eutectic freezing
E. Eutectoid or peritectoid decomposition.
2. Reduction of oxide with excess carbon:
   A. Solid state
   B. From melt.
3. Reduction of sulfides with added carbon and optionally hydrogen.
4. Reduction of chlorides with added carbon and optionally hydrogen.
5. Metathesis with other carbides.

Of these methods only the first and second are applicable to a cyclic process for fuels generation. Calcium carbide is made commercially by reduction of an oxide with excess carbon from a melt (method 2B), but this requires exceptionally high temperatures and a massive input of heat, usually furnished by electric sources.

In contrast, the processes in the first group are exothermic, supplying their own reaction heat, but require prior reduction of metal oxides to metals. The most applicable method within the first group is governed by the phase diagram of the system involved; however, methods based on solid state transformations (1A and 1E) are generally too slow to be useful for large scale synthesis.

Most systems of interest cannot be readily produced by method 1B, congruent solidification, so we are generally left with methods 1C or 1D. Method 1C could yield pure carbide in principle, but for practical configurations, the desired product will be mixed with a metal rich phase. This condition will also be found for method 1D.

We have found that for most of the modified compositions discussed earlier, a peritectic freezing process is the most favorable method of synthesizing the desired carbide.

For the modified (Fe, Mn)C system, the following constraints are present:
1. Pure $Mn_3C$ can only be made by solid state reaction since it is unstable above 1050° C.
2. Pure $Fe_3C$ is marginally unstable but may be produced by peritectic freezing at temperatures above 1050° C.
3. Fe-Mn alloys up to about 80% Mn may form carbides by peritectic freezing at temperatures which drop as the Mn content increases.

I have discovered that a molten (Fe-Mn) alloy with dissolved carbon may be modified by additions of metallic calcium, aluminum, magnesium or zinc with the following results:
1. Melting point is lowered.
2. Peritectic freezing yields a trimetal carbide $M_3C$ whose metallic atoms consist predominantly of Fe and Mn, but with lesser amounts of low melting point metals.
3. In partial freezing, a slushy mixture of $M_3C$ and liquid metal results which upon further cooling yields a multiphase solid mixture which may be readily hydrolyzed with water or steam to yield a mixture of hydrogen and hydrocarbons.

It will be understood by those familiar with the art that some departure from specified metal/carbon ratios may commonly occur in these alloy carbide systems without changing the general behavior or advantageous properties of such systems.

One may form higher carbides within this system by solid state reaction of trimetal carbides with excess carbon to yield carbides of nominal composition $M_7C_3$ (also $M_5C_2$). These may conveniently be formed by partial peritectic freezing of $M_3C$ with equilibrium metal rich phases, then adding additional powered carbon and completing solidification followed by aging or curing at temperatures of 400°-700° C.

A similar procedure may be used to form $M_3C_2$ carbides with high chromium content.

For the modified $RE_2C_3$ system (where RE represents a rare earth element), the following constraints are present:
1. Pure $La_2C_3$ or $Ce_2C_3$ may be produced by peritectic freezing at temperatures above 800° C.
2. Misch-metal alloy with dissolved carbon can yield $RE_2C_3$ by peritectic freezing above 750° C.

I have discovered that molten lanthanum, cerium or misch-metal with dissolved carbon modified by additions of barium, zinc, lead, and/or bismuth give an alloy with the following results:
1. Melting point is lowered.
2. Peritectic freezing yields a sesquicarbide containing appreciable quantities of non-lanthanide metal atoms.
3. The carbides formed upon partial or total freezing plus the interstitial metal rich phase retain the reactivity toward water or steam shown by the pure lanthanide carbides or metals.
4. The energy of reduction of the metallic alloy is lower than for the pure lanthanide system equivalent to a given amount of carbon.

The higher rare earth carbides $REC_2$ may be formed congruently from the melt at extremely high temperatures, peritectically at intermediate temperature or by solid state transformation.

I have found that the dicarbides $REC_2$ may be conveniently prepared by first forming the modified sesquicarbides, $RE_2C_3$ as previously described. By mixing excess (powdered) carbon with a partially frozen peritectic mixture consisting of a liquid metal-rich phase in equilibrium with crystalline carbide, and then cooling, a 3 phase solid mass is obtained which will slowly convert to a structure containing predominantly dicarbide if maintained at elevated temperatures (400°-700° C.).

As a practical matter in forming carbides by peritectic freezing, by mixing a controlled amount of powdered carbon with a partially frozen peritectic mixture of carbide and metal-rich liquid, removing additional heat to complete solidification and aging or curing to promote more complete transformation to carbide, one may produce carbides more easily than by employing separation techniques on partially frozen mixtures.

Hydrolysis

The results of hydrolysis experiments on metal-like carbides have been reported on numerous occasions, often with conflicting results. An examination of previous work along with my own studies has led to several generalizations in this field:
1. The metal-like carbides can be considered to be an "alloy" between excess metal and an ionic carbide where the ionic carbide would contain metal ions in a normal valence state and carbon has a nominal valence of $-4$ for most carbides whose structure leads to large C-C bond distances and a valence of $-1$ for acetylides where C-C distances below 1.3 Å are found between isolated pairs of carbon atoms.

2. Upon hydrolysis, the excess metal reduces the water to hydrogen while the ionic carbides yield methane or acetylene.
3. Some of the hydrogen tends to react with acetylene or unsaturated carbon or hydrocarbon fragments which may evolve by other processes.
4. Metastable carbides such as $Fe_3C$ or $Mn_3C$ tend to partially revert to metal and carbon which gives a higher than expected $H_2$ content on hydrolysis. From 10 to 15% or more of the total carbon content may revert to free carbon.
5. The rare earth carbides on hydrolysis behave as acetylides with excess reducing agents; they may be viewed as alloys between excess rare earth and hypothetical $REC_3$. The hydrogen evolved by the excess metal partially reduces the acetylene and partially appears as $H_2$.
6. The metal-like carbides generally produce lesser amounts of various other hydrocarbon molecules as a result of secondary reactions of intermediate or primary hydrolysis products.

Of prime importance in thermal efficiency of cyclic processes is the final state of the metal atoms following hydrolysis. By reacting the carbides with steam or water and allowing the reactants to increase in temperature, the metallic constituents may be largely recovered as oxides rather than hydroxides. As is well-known in the chemical arts, the alkali metal hydroxides cannot be dehydrated at atmospheric pressure below their boiling points, but alkaline earth metal hydroxides can be dehydrated at temperatures in the 200°–600° C. range and other metal hydroxides are more easily dehydrated. As a general rule, the hydroxides with very low water solubility are easily dehydrated.

By recovering metals in oxide form, the energy of dehydration is saved in processing the material for reduction to metal.

Description of Complete Process

The following describes the complete process for forming fuel gases or liquids from carbonaceous sources using metallic carbide synthesis and hydrolysis as intermediate steps. The process will be described in terms of preferred embodiments, it being understood that certain variations in operating conditions may be useful as operating experience is gained on larger scale installations.

A. Forming the Fuel Precursors

1. Carbonizing or pyrolyzing raw carbonaceous material to remove volatile matter and forming coke or char.
2. Mixing spent metal oxide-hydroxide residue with sufficient carbonized coke or char to reduce said metal compounds to free metal and saturate said metal with carbon and applying heat to cause such reduction.
3. Mixing said carbon-saturated molten metal with excess finely divided coke or char and maintaining such mixture at temperatures above the freezing point of the molten metal until a major fraction of the mixture has been converted to carbide compounds.
4. Removing the carbide material formed in step 3, along with various amounts of molten metal-rich solution and optionally some unconverted carbon in fine particulate form and holding said mixture at some lower temperature at which the remaining molten material solidifies, or alternatively becomes to viscous that migration of carbon or carbide particles is inhibited, until further conversion processes to form carbides are essentially complete.
5. Dividing and consolidating carbide product into agglomerates of useful size for storage or handling and cooling sufficiently to permit storage or shipment.

B. Conversion of Precursors to Fuel Products

6. Introducing said carbide agglomerates (fuel precursors) along with steam or water into a gas tight reaction chamber to effect hydrolysis to form metal oxides and/or hydroxides plus volatile fuel products consisting of fuels and optionally hydrogen plus small amounts of impurities.
7. Removing spent metal oxides/hydroxides which are returned to step 2 and recovering the heat of hydrolytic reaction.
8. Purifying generated gases and molten metals by filtering, scrubbing or slagging operations.
9. Removal and recovery of volatile fuel products.

Formation or Manufacture of Fuel Precursors

Referring now to the drawings for a more detailed explanation of the process of the invention, it can be seen that FIG. 1 is a schematic representation or flow diagram of a process for producing solid metallic carbides which can be converted, by chemical reaction, to fuel gases or liquids. Raw materials for the process are raw carbonaceous materials, and one or more metal oxides or hydroxides which may be largely supplied as recycled material from the gas generation stage of the process.

The raw carbonaceous material is reduced in particle size in crusher 16, to dimensions which will at least pass a 10 mesh screen. All of the entering carbonaceous material is pyrolyzed to remove a large portion of its constituent volatiles, although conditions in pyrolyzer 18 need not be controlled to achieve complete coking or devolatization. Thus, pyrolysis is advantageously accomplished below normal coking temperatures of about 2000° F. Rather, the raw, crushed carbonaceous materials are subjected only to a pyrolyzing temperature of about 750°–1250° F., preferably 900°–1100° F. for a time sufficient to remove from 80 to 95% by weight of the volatiles therein. The time required will be limited by heat transfer considerations and will vary from flash heating systems to 12 hours or more depending on process apparatus employed. Partial vacuum (for example, at pressures in the range pf 2 to 8 psia) may be used if desired. It is important that the pyrolyzing temperature be sufficiently high that the partial pressure of water be kept sufficiently low to convert to oxides the major proportion of dehydratable starting material hydroxides in subsequent steps of the process. Water driven off in pyrolyzer 18 can be reintroduced into the process as steam. Volatile gases with fuel value may be used to supply over-all process heat by combustion in the plant, mixed with hydrolytic process gas to augment output, or marketed as a separate fuel gas. A portion of the pyrolyzed carbonaceous material continues on to the mixer 20 for admixture with the metallic oxide/hydroxide materials. The balance of the pyrolyzed carbonaceous material is directed to synthesizer 26 where it is used to form the solid mixed metallic carbide hydrocarbon gas precursor elements.

The metallic oxide/hydroxide raw materials are passed directly to one or more crushers 12, 14 where they are reduced in particle size for ease of handling and to enhance subsequent processing, and then to mixer 20. Although the particle size of the crushed metal compounds is by no means critical, it is preferred that they pass a 20 mesh screen. In mixer 20, the ambient temperature metal oxide/hydroxide materials are thoroughly mixed, as by tumbling, with the relatively hot (800°–900° F.) pyrolyzed carbonaceous material. If spent fuel precursors from which the fuel gas has already been generated are recycled, they would be crushed, if necessary, and then metered from supply 15 in appropriate proportions directly into mixer 20.

The thoroughly admixed constituents of mixer 20 are conveyed through metering device 21 into reactor 22 where they are reduced to liquid metal at the reactor temperature of about 1400°–2400° F. A considerable quantity of heat must be supplied either by radiant energy or chamber walls heated by indirect combustion or by concurrent combustion of excess carbon inside the chamber as in a blast furnace. The time of reaction will depend on heat transfer limitations but may be expected to require several hours for commercial size reduction chambers. In the reactor, the metal oxides/hydroxides are reduced to free metal according to the reactions:

$$M_xO + C \rightarrow xM + CO$$

$$M_x(OH)_2 + 2C \rightarrow xM + 2CO + H_2$$

$$M_x(OH)_2 + C \rightarrow xM + CO + H_2O$$

where M represents the metal element.

Any by-product carbon monoxide gas generated in reactor 22 from the reduction of the metallic compounds or from the residual volatiles in the carbonaceous material is directed to a scrubber (not shown) and then marketed as a fuel gas or used to supply process heat. The composition exiting from reactor 22 is molten and consists primarily of liquid metal with dissolved carbon and an insoluble slag or impurity layer which may be separately drained and disposed. The metallic layer then enters a heated blender/reservoir 24 which has the capability to store the molten composition and via meter 25 to control the quantity of composition which passes directly to synthesizer 26. The balance of the molten composition is directed to a converter 28 which is maintained at approximately 1000° F. minimum temperature. In the converter the composition is modified as necessary, with additional quantities of carbon from supply 29 or liquid metal from supply 27. By virtue of meters 21 and 25 and the transformation capability in converter 28, the material flow to synthesizer 26 can be controlled and stabilized in order that the composition of the mixed metallic carbides produced in the process can be held at selected levels.

Three separate materials flow streams enter synthesizer 26—the pyrolyzed carbonaceous material from the pyrolyzer 18, the molten composition exiting the blender/reservoir 24, and the residual molten material from converter 28. Temperatures within synthesizer 26 are maintained in the range of 1600°–2400° F. so that a portion of the materials therein readily react to form mixtures of ternary metallic carbides. Dwell time in the synthesizer is about 4 to 7 hours and, nominally, about 5 hours to obtain the peritectic mixture initially required to allow further processing to yield hydrocarbon precursor compositions. By controlling the input to the synthesizer as hereinbefore described and by continuously monitoring and sampling the product composition from the synthesizer, the desired mixture of modified metallic carbides can be controlled.

The partially converted material exiting from the synthesizer is conveyed through line 31 to converter 28 where additional conversion occurs. In converter 28 additional carbon is added from supply 29 to react with molten metal-rich phase or alternatively to react with intermediate carbides to form carbides of higher carbon content either through solid state diffusion processes or by transmittal through a liquid metal film acting as a solvent.

The bulk of the output from converter 28 consisting of the desired mixed metallic carbides is drained into a compactor 30 where the product is compressed or otherwise formed into pellets, bricks or briquettes, preferably spherical or at least non-angular in configuration, of a size which can readily be handled and transported. Typical briquette sizes are in the range 1 to 9 inches in major dimension, although the size of the compacted fuel precursor is not critical. The shaped fuel precursors cool rapidly to ambient temperature and may be stored in bin 32, packed for shipment or immediately used to generate fuels.

Conversion of Precursors to Fuels Products

Figure 2:
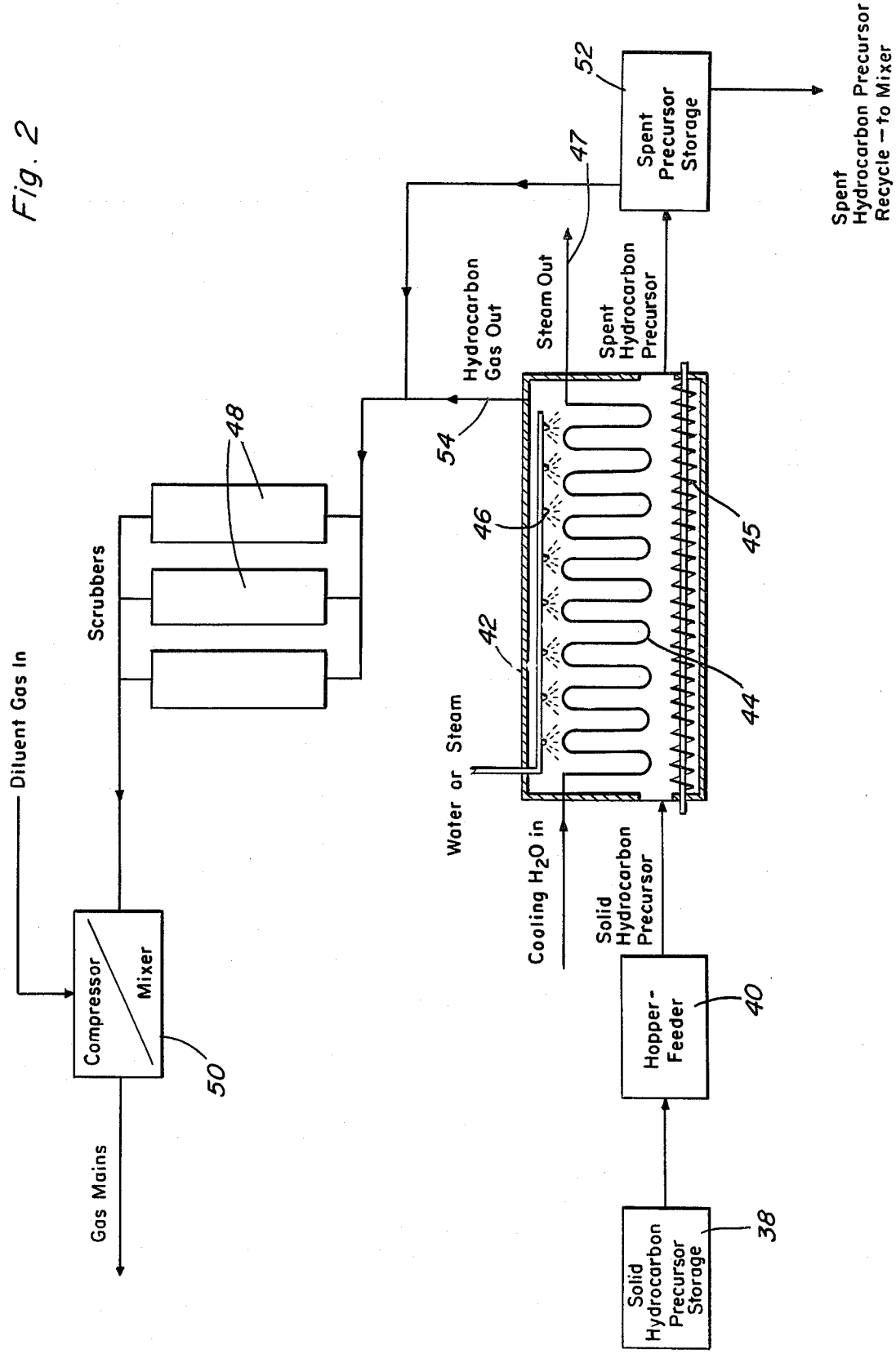
FIG. 2 is a schematic representation of a process for converting the fuel precursors into useful fuel gases or liquids.

The mixed metallic carbide fuel precursors can be converted to fuels by the process which is schematically depicted in FIG. 2. The input supply 38 to the conversion process is the fuel precursors hereinbefore produced in the process of FIG. 1, which precursors are metered from compactor 30 or bin 32 via hopper/feeder device 40 at a predetermined rate into conversion chamber 42. In chamber 42, the mixed metallic carbide fuel precursors are sprayed or otherwise contacted with water or steam to form the volatile fuel gases and the spent mixed metallic oxides or hydroxides exiting the converter are recycled to the fuel precursor production process. If desired, additives, such as odorizers, may be added to the fuel gas in the conversion chamber 42. The conversion chamber is maintained at a temperature in the range 250°–600° F., preferably 300°–450° F. In this temperature range, temperatures are high enough that most metal hydroxides will be dehydrated and low enough that unwanted vapors, such as sulfur dioxide, hydrogen sulfide, etc., can be readily removed. The reaction which forms the volatile fuels is exothermic, generating substantial quantities of reaction heat and necessitating a heat exchange system 44 in the chamber 42 to capture this heat of reaction. Preferably, coolant water is caused to flow through heat exchanger 44 to absorb and withdraw the excess reaction heat and to control the converter temperature to the desired range. The coolant water may be converted to steam which can be transported through line 47 for use elsewhere.

The fuel precursors are moved through chamber 42 by a screw conveyor 45 and are sprayed from above with the water by sprayers 46. The water is advantageously distilled water condensed from the steam line to avoid introducing dissolved minerals into the reduction stage during recycling.

The gas exiting chamber 42 through line 54 is a mixture of fuel gases or volatile fuels and water vapor which can be separated by conventional techniques in scrubbers 48. For ease and continuity of operation, a series of scrubber towers is preferably provided with appropriate conventional valving means (not shown) to permit gas flow through selected scrubber towers. In this manner, the towers can be taken off line and repacked with fresh adsorbants when necessary.

Inasmuch as there is considerable vapor production in the conversion chamber 42 creating a pressure in the range 2 to 8 psig therein, fuel precursor feed into and spent fuel precursor removal therefrom must pass through gas sealing mechanisms. The spent fuel precursor, consisting now predominantly of mixed metallic oxides, is passed into a storage pit 52 where any additionally generated volatiles can be collected prior to recycling the spent carbides to mixer 20 (see FIG. 1) as fuel precursor production input. The fuels pass from the chamber 42 and from the spent fuel storage pit 52 through scrubbers 48 into a compressor stage 50 wherein the gas pressure is raised to a level suitable for distribution, for example, in gas mains. Liquid fuels may be removed at this stage if desired. The compressor 50 also serves as a mixer unit wherein the fuel gas can be admixed with an inert (e.g., nitrogen, carbon dioxide) or active (e.g., carbon monoxide) diluent gas prior to distribution through mains or otherwise.

Impurities present in the raw feed material may be removed at special points in the process by one or more of the following methods:

1. Silica, phosphorus, sulfur or other acidic impurities arising primarily from the carbonaceous input may be removed as a dross or slag in the reactor 22 being generally immiscible and floating on liquid metal layer. Additions of lime or magnesia in amount sufficient to combine with the acidic impurities may aid in separation of said impurities. Basic impurities such as alumina would usually combine with acidic impurities normally present in excess, but if necessary controlled additions of silica can be made to effect removal.
2. Impurities introduced into the synthesizer 26 would normally be carried over into the fuel precursor product. With the exception of sulfur, they would pass through the conversion chamber 42 largely unchanged and would be removed in the reactor 22 upon recycling. Sulfur which may be released as $H_2S$ or $SO_2$ in hydrolysis can be removed by mild oxidation or absorption by basic materials (lime, soda, ash or alkaline liquids) in scrubbers 48.

EXAMPLE 1

As an example of preferred compositions in the modified (Fe, Mn)C system we list the following data.

The pyrolyzer output yields approximately 70 lb coke or char per 100 lb raw coal for medium volatile coking coals and proportionately more or less for coals of greater or lesser volatiles content.

Mixer 20 is charged with approximately 497 lb of mixed metal oxides (FeO and MnO) containing 10-65% FeO by weight, preferably about 50% with approximately 84 lb of carbon (about 90 lb coke) plus sufficient excess carbon to saturate the reduced liquid metals (about 4-5%). If the furnace is to be internally fired, additional carbon must be added and burned to CO to provide process heat. The synthesizer is charged with approximately 385 lb of liquid metal from the reactor 22 with about 36 lb of carbon (total of dissolved and added C) to permit ultimate conversion of $M_7C_3$, where M represents the metal, and sufficient soft metal to provide an interstitial liquid metal film to retain fluidity to the reacting mixture and promote diffusion of the metallic atoms. The soft metal is preferably magnesium or magnesium zinc alloy and is present in the synthesizer chamber 26 in an amount equal to 5 to 20% by weight of the Fe, Mn content. Most of the soft metal content is retained in the synthesizer and converter chambers. In the hydrolytic conversion chamber 42, approximately 421 lb of mixed metallic carbides are reacted with about 126 lb of water or steam to provide approximately 45 lb of fuels of average composition $C_nH_{3n}$ and about 5 lb of hydrogen.

EXAMPLE 2

For the modified rare earth carbide system we have the following preferred compositions.

Operation of the pyrolyzer would be essentially the same as for the Fe, Mn carbide system described in Example 1.

Mixer 20 is charged with approximately 328 lb of mixed rare earth oxides or La/Ce oxides with about 36 lb of carbon plus sufficient excess carbon to saturate the reduced liquid metals (about 2-3% by weight). Reduction of the rare earth oxides requires more drastic conditions than for Fe or Mn such as higher temperatures or reduction of partial pressures of CO as by vacuum or inert gas purge. Synthesizer 26 is charged with approximately 280 lb of liquid metal from the reactor 22 with about 48 lb of carbon (total dissolved plus added carbon) to permit ultimate conversion to $REC_2$ and sufficient soft metal to provide an interstitial liquid metal film to retain fluidity to the reacting mixture and promote diffusion of the metallic atoms. The soft metal is preferably magnesium or magnesium-lead-barium and/or zinc alloy and is present in the synthesizer chamber 26 in an amount equal to 5 to 40% by weight of the rare earth metal content. A majority of the soft metal is retained in synthesizer 26 and converter 28. In the hydrolytic conversion chamber 42, approximately 328 lb of mixed metallic carbides are reacted with about 54 lb of water or steam to provide approximately 54 lb of combined fuels plus hydrogen.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Throughout the specification and claims, unless otherwise specified, parts and proportions are expressed in weight percent, pressures in pounds per square inch absolute, temperatures in degrees Centigrade or Celsius, and heats of formation, combustion, or the like in kilocalories per mole.

What is claimed as new is as follows:

1. A process for producing fuel precursors comprising mixed metal carbide material, the process comprising the steps:
   (a) carbonizing at a pyrolyzing temperature a raw carbonaceous material to remove volatile matter therefrom and form carbon as coke or char;
   (b) mixing with said carbon a starting material selected from the group consisting of metal oxides, metal hydroxides, and mixtures thereof, said carbon being present in an amount sufficient to reduce said starting material to free metal and saturate said metal with carbon, such reduction proceeding by application of heat and removal of carbon oxides generated therein at an operating temperature sufficient to form from said metal and carbon a carbon-saturated molten metal;

(c) mixing said carbon-saturated molten metal with excess of said coke or char in a finely divided form while maintaining such mixture at a temperature above the freezing point of the molten metal for a time sufficient to convert a major fraction of the mixture to a metal carbide material and leave a minor fraction of unconverted molten metal-rich solution and unconverted carbon;

(d) removing and lowering the temperature of said carbide material, molten metal-rich solution and unconverted carbon in fine particulate form to give a product at which lower temperature the remaining molten material has become so viscous that migration of carbon or carbide particles is inhibited and at least a portion of said metal carbide material is capable of being formed into a metal carbide of higher carbon content, holding said product at said lower temperature for further conversion of said unconverted molten rich solution and unconverted carbon to a metal carbide, and for further conversion of said portion of metal carbide material formed in step (c) to a metal carbide comprising carbides of higher carbon content than said metal carbide material formed in step (c);

(e) dividing and consolidating said product after the further conversion of step (d) into agglomerates for storage or handling; the agglomerates consisting of metal carbides and a substance selected from the group consisting of interstitial metal-rich phases, free carbon, and mixtures thereof and (f) cooling the agglomerates sufficiently to permit storage or shipment as fuel precursers.

2. The process of claim 1 further including converting said agglomerates into volatile combustible products, said converting comprising the following steps:

(g) introducing the agglomerates into a gas tight reaction chamber along with steam or water to effect hydrolysis of the mixed carbide material to form a hydrolysis product comprising oxides, hydroxides or mixtures thereof and volatile products comprising hydrocarbons, hydrogen, or mixtures thereof;

(h) removing and recovering the heat of hydrolytic reaction;

(i) purifying said volatile products by filtering and scrubbing; and (j) removing and recovering said volatile products.

3. The process of claim 1 wherein said starting material in step (b) is in the form of recycled spent residue generated in a later step of the process.

4. The process of claim 1 wherein said starting material in step (b) is in the form of new raw material.

5. The process of claim 1 wherein said starting material is selected from the group consisting of a compound containing iron, a compound containing manganese and mixtures thereof.

6. The process of claim 5 wherein step (c) additionally comprises admixing said carbon-saturated molten metal with a readily corrodible, fusible, soft metal having an oxide reducible by carbon and in which iron and manganese have a measurable solubility.

7. The process of claim 1 wherein said starting material is selected from the group consisting of a compound containing iron, a compound containing manganese, a compound containing chromium, a compound containing vanadium, and mixtures thereof.

8. The process of claim 2 wherein said oxides, hydroxides or mixtures thereof are dehydrated during or following step (g) at a sufficiently high dehydrating temperature and with the partial pressure of water kept sufficiently low to dehydrate the major proportion of dehydratable metal hydroxides constituting said hydrolysis product in step (g).

9. The process of claim 7 wherein said unconverted carbon in step (c) is present in a sufficient excess to convert a portion of said remaining molten material or said metal carbide material during step (d) predominantly to a carbide material of composition $M_3C_2$, where M represents said starting material metal.

10. The process of claim 7 wherein said unconverted carbon in step (c) is present in a sufficient excess to convert a portion of said remaining molten material or said metal carbide material during step (d) predominantly to a carbide material of composition, $M_7C_3$, where M represents where M represents a said starting material metal.

11. The process of claim 1 wherein said starting material is a compound formed from elements selected from the group consisting of atomic numbers 21, 39 and 57 through 71, and mixtures thereof.

12. The process of claim 11 wherein step (c) additionally comprises admixing said carbon-saturated molten metal with a readily corrodible, fusible, soft metal having an oxide reducible by carbon and in which said elements of atomic number 21, 39 and 57 through 71 have a measurable solubility.

13. The process of claim 11 wherein said unconverted carbon in step (d) is present in a sufficient excess to convert said starting material predominantly to metal carbide of composition $REC_2$, where RE represents a rare earth metal and comprises said starting material metal.

14. The process of claim 6 wherein said soft metal is a metal selected from the group consisting of magnesium and magnesium-zinc alloy.

15. The process of claim 14 wherein said soft metal is present from about 5% to about 20% by weight of metal derived from starting material.

16. The process of claim 1 wherein said pyrolyzing temperature is from about 750° F. to about 1,250° F.

17. The process of claim 16 wherein said pyrolyzing temperature is from 900° F. to about 1,100° F.

18. The process of claim 7 wherein step (c) additionally comprises admixing said carbon-saturated molten metal with a readily corrodible, fusible, soft metal having an oxide reducible by carbon and in which said compound have a measurable solubility.

19. The process of claim 1 wherein said reaction temperature during step (b) is from about 1,400° F. to about 2,400° F.

20. The process of claim 1 wherein said steps (b), (c) and (d) are each performed in separate vessels.

* * * * *